2,924,596

$\Delta^7$-ALLOPREGNENE COMPOUNDS

Carl Djerassi, Birmingham, Mich., and George Rosenkranz and Jesus Romo, Mexico City, Mexico, assignors to Syntex S.A., Mexico City, Mexico, a corporation of Mexico No Drawing. Application September 14, 1954
Serial No. 456,048

17 Claims. (Cl. 260—239.55)

The present invention relates to cyclopentanophenanthrene compounds and process for producing the same.

More particularly the present invention relates to certain novel $\Delta^7$-allopregnen compounds which are especially suitable as intermediates for the introduction of a C-11 oxygen group in ring C.

Further, compounds of the character hereinafter described are believed to be of substantial potential value as therapeutics per se and as intermediates for biochemical introduction of a C-11 hydroxyl group.

In application of Rosenkranz, Romo and Djerassi, Serial No. 191,942, filed October 24, 1950, now U.S. Patent No. 2,858,307, a process is disclosed for the production of certain novel steroidal sapogenin compounds unsaturated in the 7,8 positon, which may be additionally unsaturated in the 9(11) or additionally unsaturated in the 5,6 and 9(11) positions.

In application of Djerassi and Rosenkranz, Serial No. 191,943, filed October 24, 1950, now abandoned, there is disclosed the production of certain novel $\Delta^7$-allopregnan derivatives starting with certain of the compounds of the previously mentioned application.

In accordance with the present invention it has been discovered that compounds of the character described in applications Serial No. 191,942 and Serial No. 191,943, when subjected to certain novel processes to be hereinafter described in detail, give rise to the production of certain novel $\Delta^7$-unsaturated steroids of the allopregnene series.

In accordance with the present invention it has been discovered that when compounds of the character of $\Delta^{7,9(11)}$-22-isoallospirostadien-3$\beta$-ol are subjected to oxidative degradation, i.e., to treatment with acetic anhydride followed by oxidation with chromium trioxide, there is produced certain novel compounds as $\Delta^{7,9,(11),16}$-allopregnatrien-3$\beta$-ol-20-one 3-acetate which may be selectively hydrogenated to a novel $\Delta^{7,9(11)}$-allopregnadien-3$\beta$-ol-20-one 3-acetate which may also be prepared by another method to be hereinafter described. Further treatment of $\Delta^{7,9(11)}$-allopregnadien-3$\beta$-ol-20-one 3-acetate with perphthalic acid produces an oxido compound wherein the oxido group is in the 9(11) positon and there is also present in the compound a double bond in the 7,8 position. The following equation illustrates the aforementioned process:

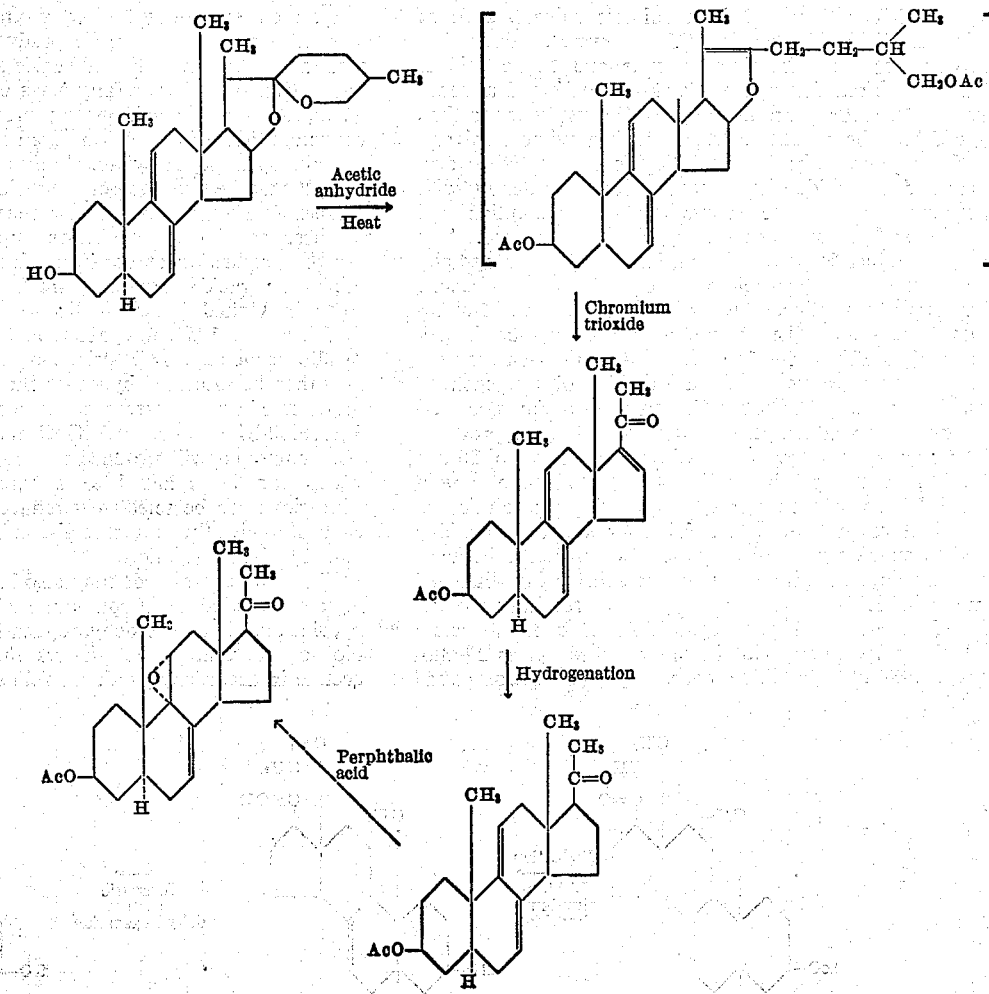

In the foregoing equation the starting material, although indicated as a sapogenin of the 22-iso series, may be of the 22-normal series. In place of the 3-hydroxy group the sapogenin starting material may also be esterified with a suitable lower fatty acid or an aromatic acid, such as benzoic acid, so as to produce the corresponding esters rather than the acetates. In practicing the above process, the sapogenin starting material, as for example $\Delta^{7,9(11)}$-22-isoallospirostadien-3β-ol, was heated in a sealed tube at a temperature in the neighborhood of 200° C. with acetic anhydride for a substantial period of time, as for example eight hours. The excess anhydride is then hydrolyzed with water, the crude furostatrien produced is then extracted with a suitable solvent, such as ether, washed until neutral and evaporated to dryness. The furostatrien is then oxidized by adding thereto an aqueous solution of chromium trioxide and acetic acid over a period of approximately half an hour. Prior to the addition of the chromium trioxide and acetic acid the furostatrien is dissolved in a suitable solvent, such as ethylene dichloride, acetic acid and water. When the addition of the chromium trioxide and acetic acid is finished the reaction mixture is allowed to stand at room temperature for approximately two hours, water is then added and the product extracted with a suitable solvent, such as ether. The ether solution is evaporated to dryness and the residue is then saponified by refluxing with potassium bicarbonate in methanol-water solution and then reacylated with acetic anhydride and pyridine. The crude product is preferably purified by chromatography and elution with a suitable solvent, such as hexane benzene, to produce $\Delta^{7,9(11),16}$-allopregnatrien-3β-ol-20-one 3 acetate. The trienalone could then be hydrogenated in the presence of a palladium-on-charcoal catalyst while dissolved in a suitable solvent, such as ethyl acetate. Preferably the hydrogenation was performed at room temperature and atmospheric pressure. The resultant product $\Delta^{7,9(11)}$-allopregnadien-3β-ol-20-one 3-acetate could then be oxidized by dissolving the same in a suitable solvent, such as ether, allowing the solution to stand at room temperature for approximately one day with a suitable aromatic peracid, such as perphthalic or perbenzoic acid, preferably the peracids being dissolved in a suitable solvent such as ether. The resultant product is 9α,11α-oxido-$\Delta^7$-allopregnen-3β-ol-20-one 3-acetate which on treatment with boron trifluoride gives $\Delta^8$-allopregnen-3β-ol-11,20-dione 3-acetate. This last compound on treatment with lithium ammonia gives the known cortisone intermediate allopregnane-3β-ol-11,20-dione.

Reduction of a compound such as $\Delta^{7,9(11)}$-allopregnadien-3β-ol-20-one 3-acetate with lithium aluminum hydride produced a novel compound characterized by a 20-hydroxy grouping which could be esterified to produce a novel diester of $\Delta^7$-3,20-diols of the pregnene series, in this particular case the compound having, in addition to the $\Delta^7$ double bond a $\Delta^{9(11)}$ double bond. The reaction involved may be exemplified by the following equation:

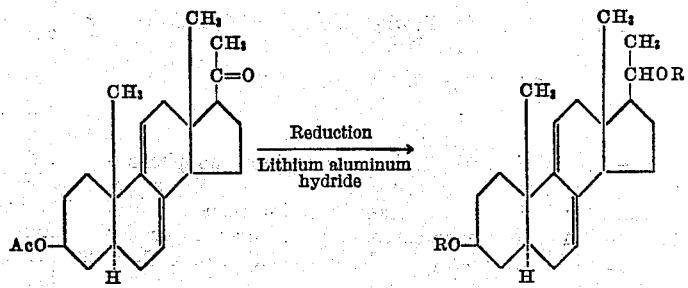

In practicing the above process, $\Delta^{7,9(11)}$-allopregnadien-3β-ol-20-one 3-acetate was dissolved in a suitable solvent, such as ether, and reduced with lithium aluminum hydride as by adding the ether solution to a lithium aluminum hydride solution in ether dropwise. Thereafter the reaction mixture was refluxed for a short period of time, as for example ten minutes, and the excess re-agent decomposed with a dilute acid. The diol thus produced was then extracted with a suitable solvent, such as ether, evaporated and recrystallized from a suitable solvent. The diacetate could then be produced by refluxing the resultant diol with acetic anhydride and pyridine. In the alternative, other lower fatty acids could be used, as for example propionic acid or an aromatic acid, such as benzoic, utilized in the form of an anhydride to produce the corresponding diacylate. In the above equation, therefore, R may be hydrogen or the residue of a suitable acid preferably a lower fatty acid or benzoic acid.

These novel compounds are important intermediates for the production of cortisone since treatment with an aliphatic peracid followed by treatment with alkali as set forth in United States application Serial No. 226,534, filed May 15, 1951, now abandoned, produces therefrom $\Delta^8$-allopregnen-3β,11α,20-triol-7-one. This compound may then be saturated by treatment with hydrogen in the presence of a palladium catalyst to prepare allogregnane-3β,11α,20-triol-7-one. Wolff-Kishner reduction of this last compound will produce allopregnane-3β,11α,20-triol which can be oxidized to allogregnane-3,11,20-trione. The trione can be selectively reduced with Raney nickel catalyst to give the known cortisone intermediate allopregnane-3β-ol-11,20-dione.

The same compounds may also be produced by reducing a corresponding $\Delta^7$ compound with lithium aluminum hydride and thereafter dehydrogenating the novel $\Delta^7$-3,20-diol or preferably the diesters thereof with mercuric acetate in accordance with the following equation:

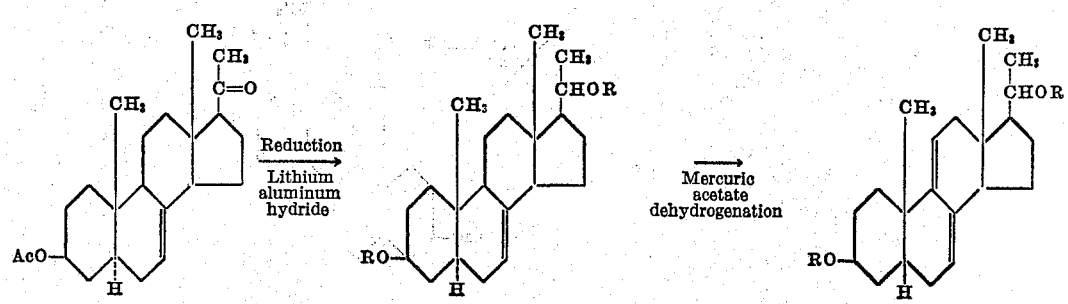

Referring to the foregoing equation, $\Delta^7$-allopregnen-3β-ol-20-one 3-acetate or other suitable 3-ester was dissolved in a suitable solvent, such as ether, and reduced with lithium aluminum hydride in precisely the same manner as the $\Delta^{7,9(11)}$ compound just above described. Upon reduction $\Delta^7$-3,20-diol was produced which could be esterified with a suitable acid, i.e. a lower fatty acid, such as acetic or benzoic acid, to produce the corresponding diacetate or other diacylate. Thereafter the $\Delta^7$-allopregnen-3β,20-diol diacetate thus produced could be dehydrogenated by dissolving the diacetate in a suitable solvent, such as chloroform and shaking the solution at room temperature for approximately eighteen hours with mercuric acetate dissolved in acetic acid. The resultant product was identical with the product prepared by the reduction of the $\Delta^{7,9(11)}$ compound, as previously set forth, and saponification of the diacetate produced a similar 3,20-diol.

Still another $\Delta^7$-3,20-diol could be produced by lithium aluminum hydride reduction of a $\Delta^{7,16}$ compound, as for example, $\Delta^{7,16}$-allopregnadien-3β-ol-20-one 3-acetate. This reaction may be exemplified by the following equation:

as sodium hydroxide, of $\Delta^{7,16}$ compounds, produced the corresponding 16,17α-oxido-$\Delta^7$-allopregnen compounds. If the $\Delta^7$ compound thus oxidized did not have the $\Delta^{9(11)}$ double bond, dehydrogenation with mercuric acetate would produce the corresponding 16,17α-oxido $\Delta^{7,9(11)}$-allopregnadien compound. This reaction may be illustrated by the following equation:

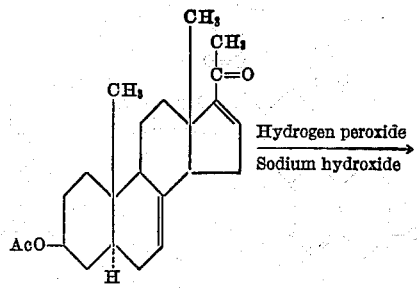
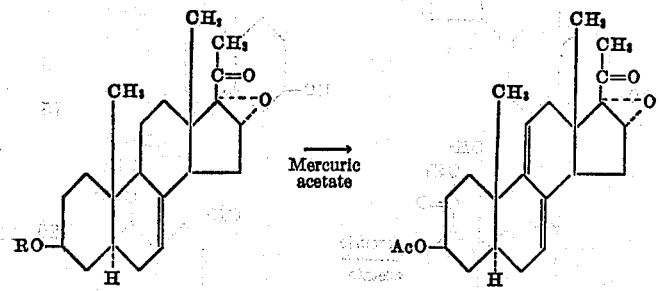

In proceeding according to the above equation $\Delta^{7,16}$-allopregnenolone acetate was dissolved in a suitable solvent, such as methanol, cooled to just below room temperature, as for example 18° C., and treated at that temperature by simultaneously dropping into the solution a hydrogen peroxide solution, as for example thirty parts hydrogen peroxide in water and a solution of sodium hydroxide in water and methanol. The reaction mixture was then stirred for a substantial period of time, as for example one hour, and the mixture was then allowed to stand while cooling, as for example to 0° C. for approximately twelve hours. The crude product obtained on dilution with water and filtration was acylated with pyridine-acetic anhydride and then recrystallized from a suitable solvent, such as methanol, to form 16,17α-oxido-

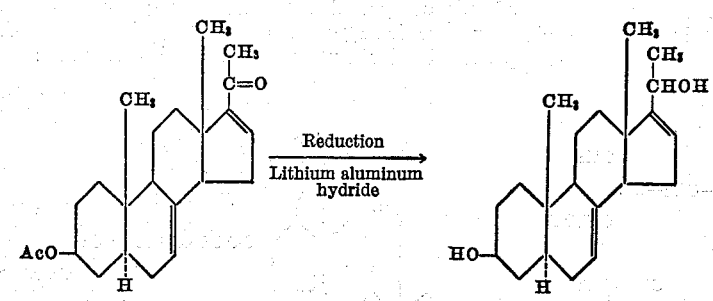

The lithium aluminum hydride reduction of the above-mentioned compounds was carried out in the same manner as previously described and the corresponding $\Delta^{7,16}$-allopregnadien-3β,20-diol was produced. Reaction with a suitable anhydride in the presence of pyridine produced the corresponding diacylates, i.e. reaction with a lower fatty acid anhydride or benzoic acid anhydride produced the 3,20 diacylates of lower fatty acids or benzoic acids, as previously set forth. Further, selective saturation of the 16-double bond with hydrogen in the presence of a palladium catalyst produced the same $\Delta^7$-allopregnen-3β,20-diol previously referred to.

In addition to the novel epoxides previously set forth, it has been found that oxidation as with hydrogen peroxide in the presence of a suitable alkali metal hydroxide, such $\Delta^7$-allopregnen-3β-ol-20-one 3-acetate. The 3-acetate could then be saponified, as with dilute potassium bicarbonate solution in methanol, to form the corresponding 3-hydroxy oxido. Instead of using acetic anhydride for acetylation, other lower fatty acid anhydrides could be used, or the anhydride of benzoic acid, to form the corresponding 3-acylate. There has, therefore, been prepared in accordance with the above equation certain novel $\Delta^7$-16,17α-oxido-allopregnens having a 3β-hydroxy group and/or the corresponding 3-esters.

The mercuric acetate dehydrogenation of $\Delta^7$-allopregnen compounds which may be additionally unsaturated in the 5,6 position gives rise to the corresponding $\Delta^{7,9(11)}$ compounds and in the specific case of the $\Delta^7$ compounds additionally unsaturated in the 5,6 position to the $\Delta^{5,7,9(11)}$ compounds. This reaction may be illustrated by the following equations:

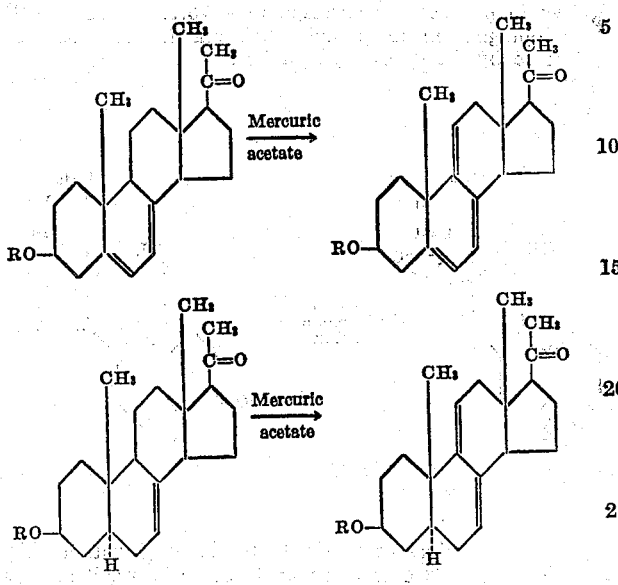

The method above illustrated, therefore, represents another method for the production of the $\Delta^{7,9(11)}$ pregnadiens. In practicing the method above illustrated a compound, as for example $\Delta^{5,7}$-pregnadien-3β-ol-20-one 3-acetate is dehydrogenated by dissolving the same in a suitable solvent, as for example chloroform, and treated with mercuric acetate and glacial acetic acid by shaking the same at room temperature for a long period of time, as for example eighteen hours. Thereafter the solution produced is filtered, more chloroform is added, and the acetone is removed by washing with water and a suitable carbonate. The solution is then dried and evaporated to produce the equivalent compounds additionally unsaturated in the 9,11 position.

The $\Delta^{5,7,9(11)}$-pregnatrien-3β-ol-20-one thus produced may be converted to the corresponding $\Delta^{7,9(11)}$-pregnadien-3β-ol-20-one previously referred to by mild selective hydrogenation using a Raney nickel catalyst.

In accordance with the present invention Oppenauer oxidation of $\Delta^7$ compounds of the character hereinbefore described, which are additionally unsaturated in the 5,6 position, produce the corresponding $\Delta^4$ ketones. Thus Oppenauer oxidation of $\Delta^{5,7}$-pregnadien-3β-ol-20-one produced $\Delta^{4,7}$-pregnadien-3,20-dione (7-dehydroprogesterone). The following equation is illustrative of this reaction:

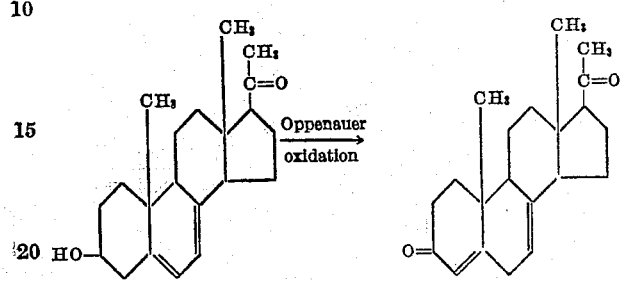

In practicing the above process the $\Delta^{5,7}$ compound, as for example $\Delta^{5,7}$-pregnadien-3β-ol-20-one was dissolved in a suitable solvent, such as toluene, dried by distilling off a portion of the solvent, and then refluxed with cyclohexanone and aluminum t-butoxide for a substantial period of time, as for example three hours. Ether was then added, the solution washed, steam distilled, and the residue abstracted with ether. The crude product could then be purified by chromatography to produce the ketone $\Delta^{4,7}$-pregnadien-3,20-dione. This compound is a useful progestational hormone. Although the above method is illustrated with the $\Delta^{5,7}$ compounds, it is believed generally applicable to $\Delta^{5,7}$ compounds of the pregnene series providing these compounds have a 3-hydroxy grouping.

Oxidative degradation of certain $\Delta^7$-allofurostadien compounds has been found in accordance with the present invention to produce a novel intermediate. Thus treatment of $\Delta^{7,20(22)}$-allofurostadien-3β,26-diol diacetate yielded the crystalline $\Delta^7$-allopregnen-3β,16β-diol-20-one 3-acetate 16-γ-methyl-δ-acetoxy valerate. Saponification of this compound with bicarbonate produced the $\Delta^{7,16}$-allopregnadien-3β-ol-20-one 3-acetate in good yield. This process is illustrated by the following equation:

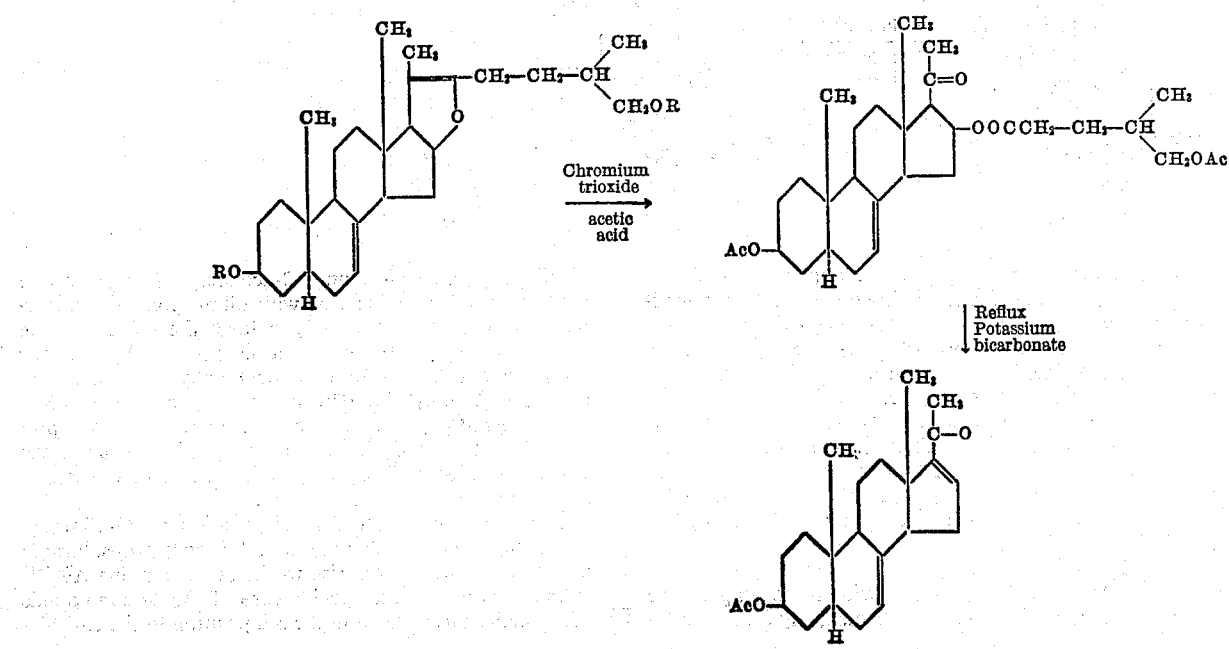

The $\Delta^{7,16}$-allopregnadien-3β-ol-20-one 3-acetate thus produced can be selectively hydrogenated to the corresponding $\Delta^7$-allopregnen-3β-ol-20-one 3-acetate, and this compound upon treatment with mercuric acetate gives the same $\Delta^{7,9(11)}$-allopregnadien-3β-ol-20-one 3-acetate previously described.

The following specific examples serve to illustrate the present invention but are not intended to limit the same:

*Example I*

$\Delta^{7,9(11),16}$-*allopregnatrien-3β-ol-20-one 3 acetate.*—A solution of 2.5 g. of $\Delta^{7,9(11)}$-22-isoallospirostadien-3β-ol, prepared in accordance with Example IV, U.S. application Serial No. 191,942, in 8 cc. of acetic anhydride was heated in a sealed tube at 196° for eight hours. The excess anhydride was hydrolyzed with water, the crude furostatriene was extracted with ether, washed until neutral, evaporated to dryness and then oxidized by adding a solution of 1.5 g. of chromium trioxide in 2 cc. of water and 20 cc. of acetic acid over a period of one-half hour to a vigorously stirred solution of the furostatriene in 35 cc. of ethylene dichloride, 40 cc. of acetic acid and 15 cc. of water. After standing at room temperature for two hours, water was added, the product extracted with ether, evaporated to dryness, the residue saponified by refluxing for thirty-five minutes with a solution of 2 g. of potassium bicarbonate in 100 cc. of methanol and 15 cc. of water and then reacetylated with acetic anhydride and pyridine at room temperature. On chromatographing the crude product on alumina and eluting with mixtures of hexane-benzene (8:2), there was obtained the desired trienolone $\Delta^{7,9(11),16}$-allopregnatrien-3β-ol-20-one 3-acetate with a melting point of 161–163° C. (after recrystallization from methanol), $(\alpha)_D^{20}$ +196°, ultraviolet maximum at 234 mu (log $E$ 4.44). Catalytic hydrogenation with palladium-on-charcoal in ethyl acetate solution at room temperature and atmospheric pressure afforded $\Delta^{7,9(11)}$-allopregnadien-3β-ol-20-one 3-acetate, identical in all respects with a sample prepared by the method of Example XI.

*Example II*

$\Delta^7$-*allopregnen-3β,20-diol.*—A solution of 4.0 g. of $\Delta^7$-allopregnen-3β-ol-20-one 3-acetate prepared in accordance with Example II of application Serial No. 191,943, in 50 cc. of ether was added dropwise to a solution of 2 g. of lithium aluminum hydride in 50 cc. of ether. After refluxing for ten minutes, the excess reagent was decomposed with dilute acid, the diol, $\Delta^7$-allopregnen-3β,20-diol, extracted with ether, evaporated and recystallized from ether-pentane; melting point 179–180° C., $(\alpha)_D^{20}$ −21.8°. When refluxed for one hour with acetic anhydride and pyridine, there was obtained after recrystallization from methanol the diacetate of $\Delta^7$-allopregnen-3β,20-diol with a melting point of 104–106° C., $(\alpha)_D^{20}$ −3.2°.

*Example III*

$\Delta^{7,9(11)}$-*allopregnadien-3β,20-diol.*—(a) By lithium aluminum hydride reduction of $\Delta^{7,9(11)}$-*allopregnadien-3β-ol-20-one 3-acetate.*—2 grams of the dienolone acetate product of Example I in 50 cc. of ether was reduced with 1 g. of lithium aluminum hydride in 50 cc. of ether according to the procedure of Example II. Recrystallization from acetone gave the diol, $\Delta^{7,9(11)}$-allopregnadien-3β,20-diol, with a melting point of 183–185° C., $(\alpha)_D^{20}$ +24.4°, ultraviolet maxima at 236 mu (log $E$ 4.28) and 242 mu (log $E$ 4.33).

Acetylation with acetic anhydride-pyridine produced the diacetate with a melting point of 113–115° C. (after recrystallization from methanol), $(\alpha)_D^{20}$ +23.5°.

(b) *By mercuric acetate dehydrogenation of $\Delta^7$-allopregnen-3β,20-diol diacetate.*—A solution of 1 g. of the diacetate product of Example II in 25 cc. of chloroform was shaken at room temperature for eighteen hours with 2 g. of mercuric acetate dissolved in 40 cc. of acetic acid. The product, purified by chromatography and recrystallization from methanol showed a melting point of 110–112° C. $(\alpha)_D^{20}$ +23.9° and gave no depression on admixture with a specimen prepared according to (a). The ultra violet absorption spectrum also was identical and the substance gave a red color with tetranitromethane, typical for conjugated dienes.

*Example IV*

*Reaction of $\Delta^{7,9(11)}$-allopregnadien-3β-ol-20-one 3-acetate with perphthalic acid.*—A solution of 1 g. of the diene of Example I in 30 cc. of ether was allowed to stand at room temperature for twenty-four hours with 1.3 mols of perphthalic acid (other peracids such as perbenzoic acid could also be used) in 40 cc. of ether. After washing with sodium carbonate and water, the solvent was evaporated and the residue passed through a short column of alumina. The crystalline eluates showed no selective absorption in the ultraviolet, but gave a yellowish color with tetranitromethane indicating the presence of one double bond. The analysis was in good agreement with that expected for a monoepoxide and the compound 9α,11α-oxido-$\Delta^7$-allopregnene-3β-ol-20-one 3-acetate had a melting point of 188–190° C. (after recrystallization from methanol-water), $(\alpha)_D^{20}$ −5°.

*Example V*

$\Delta^{7,16}$-*allopregnadien - 3β,20-diol.*—The lithium aluminum hydride reduction of $\Delta^{7,16}$-allopregnadien-3β-ol-20-one-3-acetate prepared in accordance with Example I, application Serial No. 191,943, was carried out as described in Example II in ether solution (15 minutes' refluxing) and after recrystallization from ether-hexane afforded the above diol with a melting point of 145–147° C., $(\alpha)_D^{20}$ +6.6°. The substance showed no selective absorption in the ultraviolet.

*Example VI*

*16,17α-oxido-$\Delta^7$-allopregnen-3β-ol-20-one.*—A solution of 5.0 g. of $\Delta^{7,16}$-allopregnenolone acetate in 400 cc. of methanol was cooled to 18° and treated at that temperature with stirring simultaneously from two dropping funnels with 10 cc. of 30% hydrogen peroxide and with a solution of 2.3 g. of sodium hydroxide in 10 cc. of water and 25 cc. of methanol. After stirring for an additional hour, the mixture was allowed to stand at 0° overnight. The product, obtained on dilution with water and filtration, was acetylated with pyridine-acetic anhydride and then recrystallized from methanol. The 3-acetate of 16,17α-oxido-$\Delta^7$-allopregnen-3β-ol-20-one had a melting point of 153–155° C., $(\alpha)_D^{20}$ +28.2°, and an ultraviolet absorption maximum at 270 mu (log $E$ 1.90) typical of an isolated carbonyl group. Saponification with dilute methanolic potassium bicarbonate solution followed by recrystallization from dilute acetone afforded 16,17α-oxido-$\Delta^7$,allopregnene-3β-ol-20-one with a melting point of 124–126° C., $(\alpha)_D^{20}$+28.8°.

*Example VII*

*16,17α-oxido-$\Delta^{7,9(11)}$-allopregnadien-3β-ol-20-one 3-acetate.*—To a solution of 1 g. of the acetoxy oxide of Example VI in 25 cc. of chloroform was added a solution of 2 g. of mercuric acetate in 40 cc. of acetic acid at room temperature and the mixture was shaken for twenty hours. After dilution with water, the product was extracted with chloroform, washed well with water, dried, evaporated and recrystallized from methanol; the product 16,17α-oxido-$\Delta^{7,9(11)}$ - allopregnadien-3β-ol-20-one 3-acetate had a melting point of 153–155° C., $(\alpha)_D^{20}$ +117.5°, ultraviolet maximum 232 mu (log $E$ 4.13) and 242 mu log $E$ 4.18).

*Example VIII*

$\Delta^{5,7,9(11)}$-*pregnatrien-3β-ol-20-one.*—The dehydrogenation was carried out in the manner set forth in Example III(b) with 3.7 g. of $\Delta^{5,7}$-allopregnadien-3β-ol-20-one 3-acetate prepared according to the procedure of Example V of application Serial No. 191,943, 8.0 g. of C.P. mercuric acetate, 150 cc. of acetic acid and 100 cc. of chloroform for eighteen hours. Crystallization from methanol yielded 1.44 g. (39%) of $\Delta^{5,7,9(11)}$-pregnatrien-3β-ol-20-one 3-acetate with a melting point of 143–145° (Kofler), unchanged on further recrystallization; $(\alpha)_D^{20}$ +323.9°, ultraviolet maxima at 310 mu (log $E$ 4.23), 324 mu (log $E$ 4.27) and 338 mu (log $E$ 4.07).

*Analysis.*—Calculated for $C_{23}H_{30}O_3$: C, 77.93; H, 8.53. Found: C, 77.57; H, 8.38.

$\Delta^{5,7,9(11)}$-pregnatrien-3β-ol-20-one having a melting point of 201–203° (Kofler), $(\alpha)_D^{20}$ +284.5° was obtained on saponification of the above acetate and recrystallization from acetone.

*Analysis.*—Calculated for $C_{21}H_{28}O_2$: C, 80.73; H, 9.03. Found: C, 80.65; H, 9.14.

Example IX $\Delta^{4,7}$-*pregnatrien-3,20-dione (7-dehydroprogesterone)*.—A solution of 1.0 g. of $\Delta^{5,7}$-pregnadien-3β-ol-20-one in 170 cc. of toluene was dried by distilling 20 cc., and was then refluxed for three hours with 25 cc. of cyclohexanone and 2.0 g. of aluminum t-butoxide. After addition of some ether, the solution was washed with water, Rochelle salt solution, and again with water, steam distilled and the residue extracted with ether. Chromatography of the crude product on 25 g. of ethyl acetate-washed alumina and elution with hexane-benzene (1:1) afforded the desired ketone in about 40% yield with a melting point of 106–108° C., $(\alpha)_D^{20}$ +102°, ultraviolet maximum at 238 mu (log $E$ 4.29).

*Analysis.*—Calculated for $C_{21}H_{28}O_2$: C, 80.73; H, 9.03. Found: C, 80.46; H, 9.25.

Example X $\Delta^{7,16}$-*allopregnadien-3β-ol-20-one 3-acetate*.—A solution of 100 g. of $\Delta^7$-22-isoallospirosten-3β-ol 3-acetate, prepared in accordance with application Serial No. 191,-942, in 500 cc. of acetic anhydride was heated in a stainless steel autoclave for eight hours at 196° C. and then poured into ice-cold water. After allowing the excess acetic anhydride to hydrolyze, the oily acetate was extracted with ether, washed well with water and bicarbonate, dried and evaporated. In one experiment, a small amount of the acetate was saponified by boiling with 5% methanolic potassium hydroxide solution and diluted with water. Filtration and several recrystallizations from hexane-acetone afforded the analytical sample of $\Delta^{7,20(22)}$-allofurostadien-3β,26-diol with a melting point of 175–177° (Kofler), $(\alpha)_D^{20}$ +36° (dioxane).

*Analysis.*—Calculated for $C_{27}H_{42}O_3$: C, 78.21; H, 10.21. Found: C, 78.12; H, 10.16.

The above oily diacetate was dissolved in a mixture of 1.6 liters of acetic acid and 300 cc. of water, and treated with stirring at 15° over a period of one-half hour with a solution of 60 g. of chromium trioxide in 80 cc. of water and 800 cc. of acetic acid. After 2 hours at room temperature, water was added and the mixture was extracted with chloroform, washed with water and bicarbonate solution, dried and evaporated. Crystallization from methanol yielded 35 g. (30%) of $\Delta^7$-allopregnen-3β,16β-diol-20-one 3-acetate 16-γ-methyl-δ-acetoxyvalerate with a melting point of 104–107° C. Further recrystallization from methanol raised the melting point of the colorless crystals to 113.5–115.5° C. (Kofler), $(\alpha)_D^{20}$ 0°, ultraviolet maximum at 276 mu (log $E$ 1.62).

*Analysis.*—Calculated for $C_{31}H_{46}O_7$: C, 70.16; H, 8.74. Found: C, 70.11; H, 8.87.

The filtrate was evaporated to dryness and the residue was refluxed for thirty-five minutes with a solution of 80 g. of potassium bicarbonate in 180 cc. of water and 1.5 liters of methanol. Dilution with water, extraction with ether, reacetylation of the product with acetic anhydride in pyridine solution (1 hour, 100°) followed by crystallization from methanol gave 7.3 g. of $\Delta^{7,16}$-allopregnadien-3β-ol-20-one 3-acetate with a melting point of 136–139° C. Chromatography of the mother liquors afforded an additional 8.5 g. of dienolone acetate with a melting point of 134–138° C. Since similar saponification of the ester, $\Delta^7$-allopregnen-3β,16β-diol-20-one 3-acetate 16-γ-methyl-δ-acetoxyvalerate, gives between 80–90% of dienolone, the total yield of $\Delta^{7,16}$-allopregnadien-3β-ol-20-one 3-acetate is 44–47% based on the original spirosten. The analytical sample was obtained by recrystallization from methanol as colorless crystals with a melting point of 145–147° C. (Kofler), $(\alpha)_D^{20}$ +58°, ultraviolet maximum at 23 mu (log $E$ 4.11).

*Analysis.*—Calculated for $C_{23}H_{32}O_3$: C, 77.49; H, 9.05. Found: C, 77.71; H, 8.79.

Example XI $\Delta^{7,9(11)}$-*allopregnadien-3β-ol-20-one*.—The mercuric acetate treatment of $\Delta^7$-allopregnadien-3β-ol-20-one 3-acetate, prepared in accordance with Example III of application Serial No. 191,943, was carried out exactly as described in Example III(b) and led in 58% yield to $\Delta^{7,9(11)}$-allopregnadien-3β-ol-20-one 3-acetate, which after recrystallization from methanol exhibited a melting point of 139–141° C. (Kofler), $(\alpha)_D^{20}$ +78.9, ultraviolet maxima at 236 mu (log $E$ 4.00) and 242 mu (log $E$ 4.03).

*Analysis.*—Calculated for $C_{23}H_{32}O_3$: C, 77.49; H, 9.05. Found: C, 77.52; H, 9.35.

$\Delta^{7,9(11)}$-allopregnadien-3β-ol-20-one, obtained on saponification of the above acetate, crystallized from acetone as brilliant prisms with a melting point of 201–203° C. (Kofler), $(\alpha)_D^{20}$ +74.1°, ultraviolet maxima at 236 mu (log $E$ 4.08) and 242 mu (log $E$ 4.13).

*Analysis.*—Calculated for $C_{21}H_{30}O_2$: C, 80.21; H, 9.62. Found: C, 80.21; H, 9.90.

The present application is a continuation-in-part of our application Serial No. 229,264, filed May 31, 1951, now abandoned.

We claim:

1. A $\Delta^{7,9(11)}$ compound of the allopregnene series having the following structural formula:

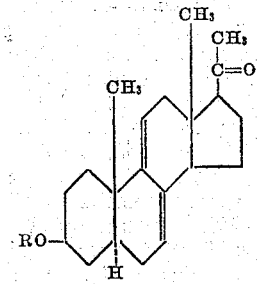

wherein R is selected from the group consisting of hydrogen, the residue of a lower fatty acid and the residue of benzoic acid.

2. $\Delta^{7,9(11)}$-allopregnadien-3β-ol-20-one 3-acetate.

3. $\Delta^{7,9(11)}$-allopregnadien-3β-ol-20-one.

4. A 16,17α-oxido-$\Delta^7$ compound of the allopregnene series selected from the group consisting of compounds having the following structural formulas:

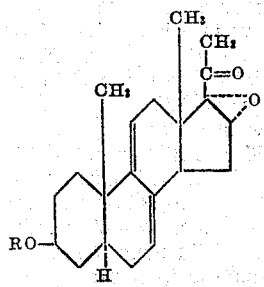

and

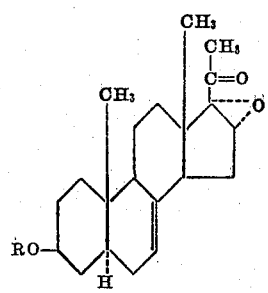

wherein R is selected from the group consisting of hydrogen, the residue of a lower fatty acid and the residue of benzoic acid.

5. 16,17α-oxido-Δ⁷-allopregnen-3β-ol-20-one.
6. 16,17α-oxido-Δ⁷-allopregnen-3β-ol-20-one 3-acetate.
7. 16,17α-oxido-Δ⁷,⁹⁽¹¹⁾-allopregnadien-3β-ol-20-one 3-acetate.
8. Δ⁷,⁹⁽¹¹⁾-allopregnadien-3β,20-diol.
9. Δ⁷,⁹⁽¹¹⁾-allopregnadien-3β,20-diol diacetate.
10. Δ⁷-allopregnen-3β,20-diol.
11. Δ⁷-allopregnen-3β,20-diol diacetate.
12. Δ⁷,¹⁶-allopregnadien-3β,20-diol.
13. Δ⁷,⁹⁽¹¹⁾,¹⁶-allopregnatriene-3β-ol-20-one 3-acetate.
14. Δ⁴,⁷-pregnadien-3,20-dione.
15. Δ⁷-allopregnen-3β,16β-diol-20-one 3-acetate-16-γ-methyl-δ-acetoxyvalerate.

16. ⁷,⁹⁽¹¹⁾-allopregnadiene-3-ol-20-one of the formula

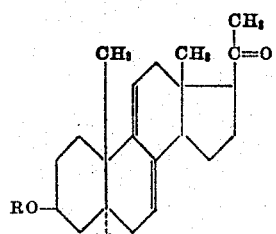

wherein R is a lower fatty acid radical.

17. 9α,11α-oxido-Δ⁷-allopregnene-3β-ol-20-one 3 - acetate.

References Cited in the file of this patent
UNITED STATES PATENTS

| | | |
|---|---|---|
| 2,420,490 | Marker | May 13, 1947 |
| 2,595,596 | Moffett | May 6, 1952 |
| 2,734,897 | Chemerda | Feb. 14, 1956 |

FOREIGN PATENTS

| | | |
|---|---|---|
| 1,052,936 | France | Sept. 30, 1953 |

OTHER REFERENCES

Djerassi: Jour. Org. Chem. 16, 754–60 (1951).
Romo: Jour. Am. Chem. Soc. 73, 5489–90 (1951).
Fieser and Fieser: Natural Products Related to Phenanthrene, 3rd edition (1949), pages 174; 180; 188–9; 226–231; 251; 389; 410; 590.